(12) United States Patent
Hafen et al.

(10) Patent No.: US 7,178,657 B1
(45) Date of Patent: Feb. 20, 2007

(54) CONCRETE CHUTE ATTACHMENT

(76) Inventors: McKay Hafen, 2144 Hafen La., Santa Clara, UT (US) 84765; Julie Hafen, 2144 Hafen La., Santa Clara, UT (US) 84765

(*) Notice: Subject to any disclaimer, the term of this patent is extended or adjusted under 35 U.S.C. 154(b) by 277 days.

(21) Appl. No.: 10/845,015

(22) Filed: May 14, 2004

(51) Int. Cl.
*B65G 11/18* (2006.01)
(52) U.S. Cl. .................. 193/4; 193/10; 366/68
(58) Field of Classification Search .............. 366/68, 366/187; 193/4–6, 10, 2 A
See application file for complete search history.

(56) References Cited

U.S. PATENT DOCUMENTS

| | | | |
|---|---|---|---|
| 1,733,118 A | * | 10/1929 | Eddy ................. 193/20 |
| 3,068,981 A | * | 12/1962 | Stegmeier et al. ........... 193/10 |
| 3,456,769 A | * | 7/1969 | Prichard et al. ............. 193/4 |
| 3,746,140 A | | 7/1973 | Schiffelbein |
| 3,866,889 A | * | 2/1975 | Maxon ..................... 366/27 |
| 4,190,144 A | | 2/1980 | Lybbert |
| 5,605,398 A | * | 2/1997 | Cronquist ................. 366/68 |
| 6,106,141 A | * | 8/2000 | Bruun ...................... 366/68 |
| 2005/0122835 A1 | * | 6/2005 | Nussbaum .............. 366/183.1 |

* cited by examiner

*Primary Examiner*—David Sorkin
(74) *Attorney, Agent, or Firm*—Crossley Patent Law; Mark A. Crossley

(57) ABSTRACT

A chute extension for a typical concrete mixing truck, the extension has a chute attachment spring clip on the attachment end and a funneled outlet on the delivery end. The invention further comprises an angle where the delivery end meets the end of the trough, for more laminar flow of concrete. The included concrete rake has a telescoping handle.

3 Claims, 4 Drawing Sheets

CONCRETE CHUTE ATTACHMENT

BACKGROUND OF THE INVENTION

1. Field of the Invention

The present invention relates to concrete chutes of concrete mixing trucks and more particularly to a new concrete chute attachment that allows greater control in the dispensing flow of concrete.

2. Description of the Prior Art

Concrete chutes and their attachments, particularly those used in conjunction with a concrete truck or the like, are known in the prior art and are typically devised of basically familiar and obvious structural configurations. By way of example:

U.S. Pat. No. 6,106,141 to Bruun discloses a chute system with a flexible tube mounted distally to the system and attached at a right angle near the delivery end of same. It differs from the present invention in that concrete flow must make a radical departure from laminar movement and also in that the distal delivery mechanism is flexible U.S. Pat. No. 3,746,140 to Schiffelbein discloses a concrete chute attachment with a large flexible tube at its delivery end, and, in that way and more, differs from the present invention.

U.S. Pat. No. 4,190,144 to Lybbert discloses a discharge system for discharging concrete from a mix truck. This system is typical in present usage and is one for which the current invention is meant to add to.

While the above-described devices fulfill their respective and particular objects and requirements, they do not describe a concrete chute attachment that provides for all of the advantages of the present invention.

Therefore, a need exists for an improved concrete chute attachment, particularly one that provides greater control of concrete flow. In this respect, the present invention substantially departs from the conventional concepts and designs of the prior art.

SUMMARY OF THE INVENTION

In view of the foregoing disadvantages inherent in the known types of concrete chutes and attachments now present in the prior art, the improved concrete chute attachment overcomes the above-mentioned disadvantages and drawbacks or the prior art. As such, the general purpose of the concrete chute attachment, described subsequently in greater detail, is to provide a concrete chute attachment which has all of the advantages of the prior art mentioned heretofore and many novel features that result in an improved concrete chute attachment which is not anticipated, rendered obvious, suggested, or even implied by the prior art, either alone or in combination thereof.

The improved concrete chute attachment comprises a trough which is shaped identically to that of the entirely typical concrete mixing truck chute. The invention is selectively and removably attached to a typical truck chute by a spring clip mechanism. The clip mechanism preferably consists of flat stock spring steel but may be made from any material with like properties. The mechanism is substantially an inverted U-shape with the U-shape disposed outwardly from the peripheral edges of the invention, on the attachment end of same. Curving around in that U-shape to form a loop, the clip then curves back in toward the trough, and therefore back in toward the truck's chute for which the invention is shaped to fit within. Beyond this inwardly curving constriction section, the spring clip flares back outward. This outward flare allows a user to selectively force the spring clip over a typically built truck chute. The invention's clips are then forced over the typically bulbous edges of the truck chute, wherein the loop's constriction forms a snug fit over the truck chute edges. Any part of the invention's trough may then be fitted within the truck's chute, allowing adjustment of the extending length of the invention's trough. The trough might be inserted only a few inches into the truck's chute, or it may be slid upwardly to reveal only its outlet.

In this way, concrete delivery can be more accurately provided to the user, as the user may longitudinally position the trough as desired. Additionally, the trough may be instantly adjusted in length, with respect to the truck's chute.

Once the trough of the desired embodiment is positioned, concrete flow is aided by the angled end plate's attachment to the trough, thereby providing for a laminar flow, as opposed to prior art which has a direct abutment, causing the heavily viscous concrete to collide with same and hesitate to flow. The angle formed by the attachment of the end plate and the trough is acute and preferably between 20 and 45 degrees from vertical. Typical prior art, with its 90-degree abutment of chutes and ends, may cause concrete to back fill and overflow from a typical chute or extension.

Laminar flow is further aided by the funnel attached to the bottom side opening of the trough, at its delivery end. The funnel, with its upper cone reducing to a smaller diameter lower cone, further channels concrete in a smooth path into the outlet nozzle and out of the nozzle's outlet.

The concrete chute attachment trough is preferably 2 feet long but may be offered in a variety of lengths. As typical concrete truck chutes are long and can swivel, the reduced length of the present invention provides for small attachment that further provides for the laminar channeling of concrete to its most desired position, while, at the same time, providing for a lightweight device which may be easily stored on a truck and more effortlessly put into use.

Further advantages of the improved concrete chute attachment include its spring clip design, making it easy to install and remove. In addition, the telescoping rake of the present invention provides for easier concrete channeling out of the trough as well as providing a tool for cleanup after concrete traverses the trough, and a tool which can be adjusted to fit a user or situation more easily.

In an additional embodiment, the present concrete chute attachment features a 90-degree end flap with spring loaded actuation resistance. This embodiment might be utilized when filling a wheelbarrow or small form, wherein limited flow of concrete is desired. The end flap pivots outwardly from its top edge, which aligns with the top peripheral edges of the trough's delivery end, and may be opened by hand or encouraged to open with the accompanying rake, thereby allowing concrete to flow out.

The concrete chute attachment may be comprised of metal, plastics, a combination thereof, or other appropriate materials and combinations of materials.

Thus has been broadly outlined the more important features of the concrete chute attachment so that the detailed description thereof that follows may be better understood and in order that the present contribution to the art may be better appreciated.

Numerous objects, features and advantages of the concrete chute attachment will be readily apparent to those of ordinary skill in the art upon reading the following detailed description of presently preferred, but nonetheless illustrative, embodiments of the concrete chute attachment when taken in conjunction with the accompanying drawings. In this respect, before explaining the current embodiments of the concrete chute attachment in detail, it is to be understood that the invention is not limited in its application to the details of construction and arrangements of the components set forth in the following description or illustration. The invention is capable of other embodiments and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the concrete chute attachment.

It is therefore important that the claims be regarded as including such equivalent constructions insofar as they do not depart from the spirit and scope of the present invention.

A primary object, then, of the present invention is to provide a concrete chute attachment that is lightweight.

An added object is to provide a concrete chute attachment that is easily portable.

Another object is to provide a concrete chute attachment that is easily attached to and removed from a typical concrete truck chute.

Still another object is to provide a concrete chute attachment that provides laminar flow of concrete.

A further object is to provide a concrete chute attachment that resists spillage of concrete.

Further, it is an object to provide a concrete chute attachment that provides the most exact delivery of concrete to its desired location.

An added object is to provide an attachment whose length with regard to a truck's chute is instantly adjustable.

Another object is to provide a concrete chute attachment that can be manufactured from a variety of materials.

Still another object is to provide a concrete chute attachment that is readily cleaned.

Still a further object is to provide a concrete chute attachment that does not waste concrete.

Also, an object is to provide a concrete chute attachment that fits all typically used concrete truck chutes.

And, it is an object to provide a concrete chute attachment that is inexpensively manufactured.

These together with additional objects of the concrete chute attachment, along with various novel features that characterize the invention are particularly pointed out in the claims forming a part of this disclosure. For better understanding of the concrete chute attachment, its operating advantages and specific objects attained by its uses, refer to the accompanying drawings and description.

DETAILED DESCRIPTION OF THE PREFERRED EMBODIMENTS

Figure 1:
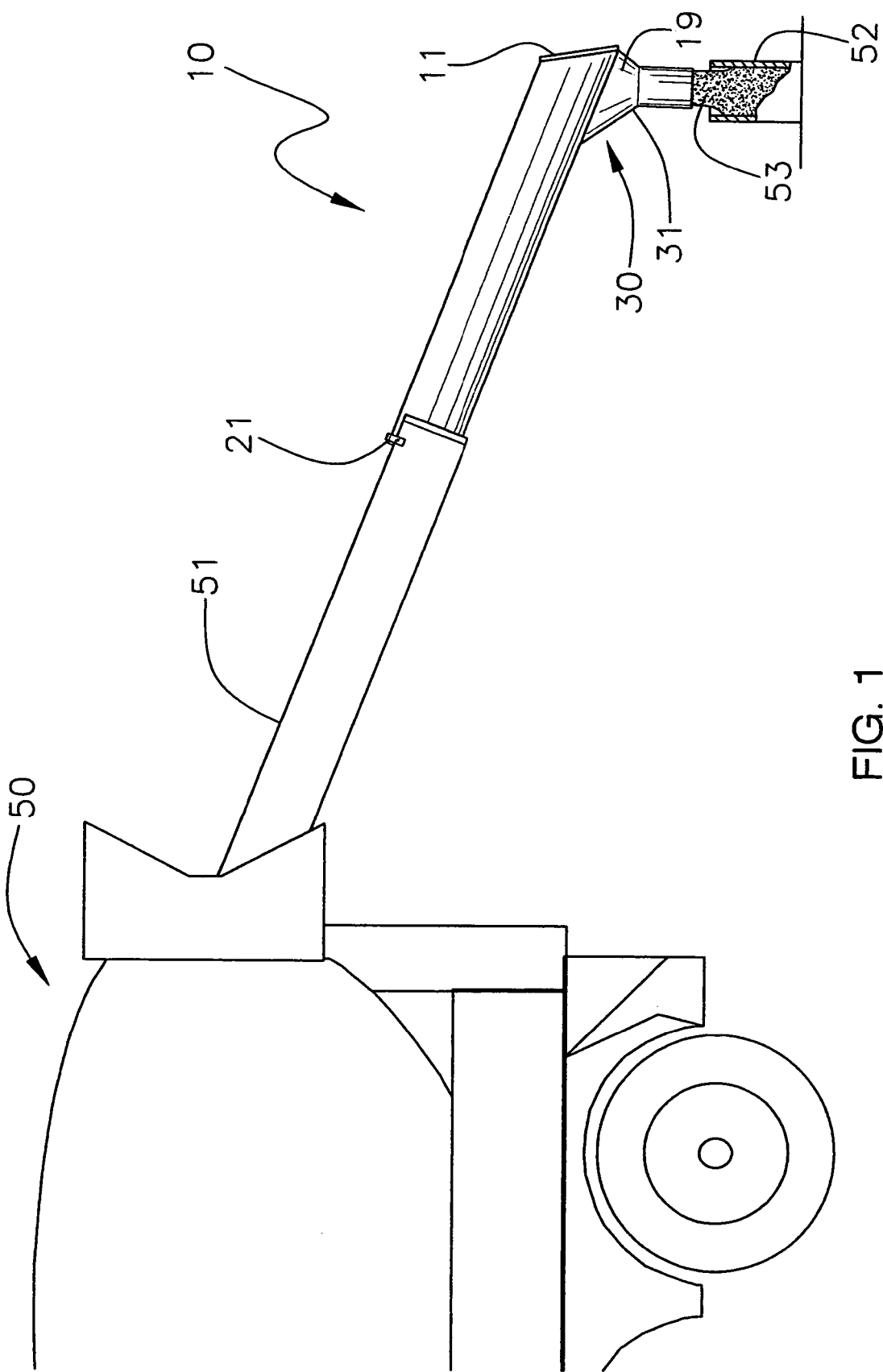
FIG. 1 is a lateral view of the preferred embodiment of the invention.
Figure 2:
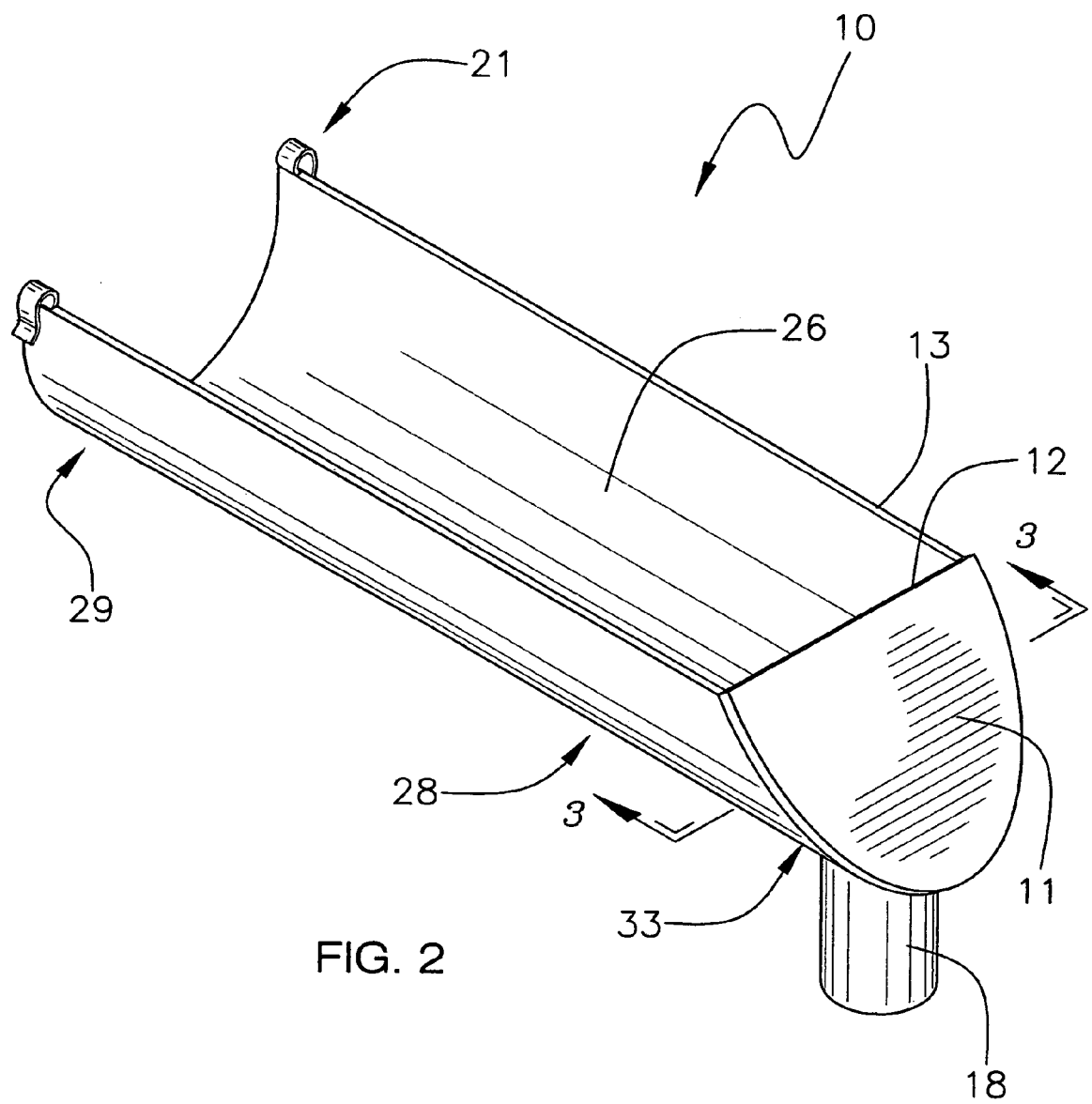
FIG. 2 is a perspective view of the invention.
Figure 3:
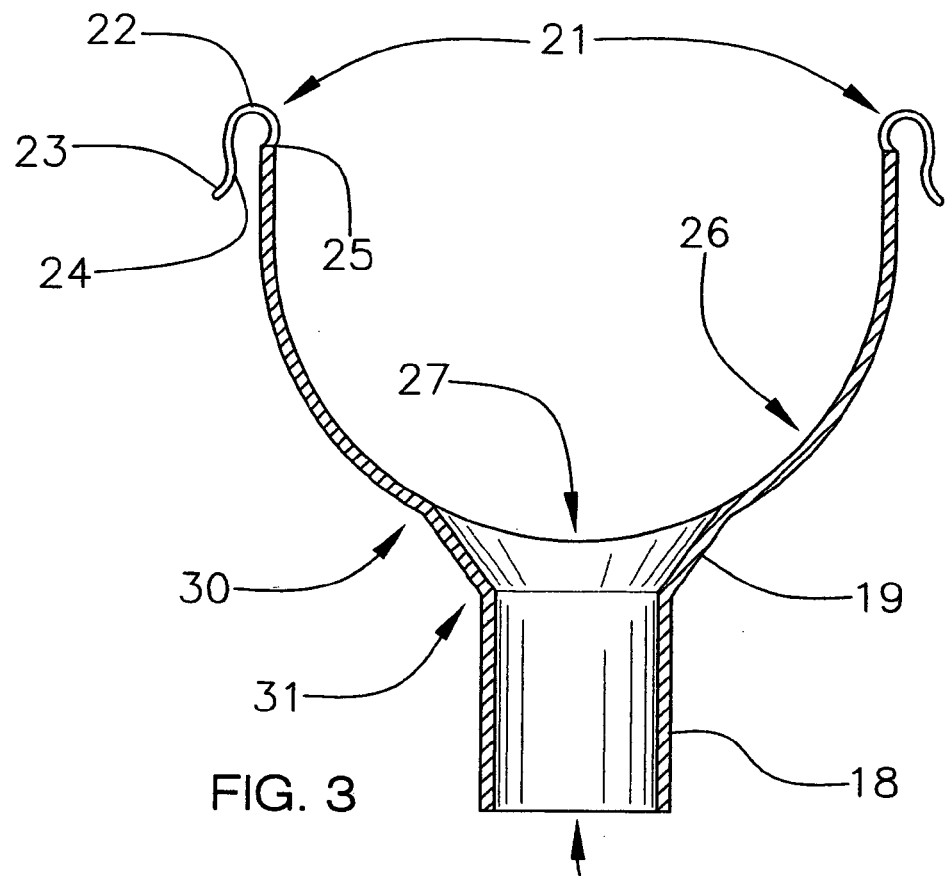
FIG. 3 is a cutaway view of FIG. 2.

With reference now to the drawings, and in particular FIGS. 1 through 6 thereof, the preferred embodiments of the concrete chute attachment employing the principles and concepts of the present invention and generally designated by the reference number 10 will be described.

Referring now to FIGS. 1–4, the improved concrete chute attachment 10, in its preferred embodiment, comprises a hollow U-shaped trough 26 comprising a lower half of a cylinder with an open top bordered on each upper edge by a pair of peripheral edges 13 along the longitudinal upper border of the trough 26. Trough 26 is longitudinally bounded by its attachment end 29 which fits into a typical discharge chute 51 of an equally conventional concrete mixer truck 50. Trough 26 is bounded on its opposite end by delivery end 28. Upon placement of end 29 of invention 10 into discharge chute 51, chute attachment spring clips 21 loop securely around typically existing chute 51 lips (not shown), which form the upper edges of typical chutes 51. Lips are partially bulbous in construction (not shown). Such discharge chute 51 construction is of entirely conventional character.

Spring clips 21 are of inverted U-shape. Clips 21 are permanently attached to the upper part of peripheral edges 13 at loop attachment 25. Clips 21 scribe a shape first upward, outwardly, then downwardly relative to edges 13, forming spring clip loops 22. Upon downwardly passing a plane beyond that of typical chute 51 lips, clips 21 shapedly curve into loop constrictions 24. From thence clips 21 extend downward and outward into spring clip flares 23. Flares 23 provide for smoothly forced selective attachment and removal of the invention 10 to and from existing chutes 51. Clips 21 are typically installed about 2" or more upwards of the distal ends of typical discharge chutes 51, providing trough 26 a partial bed within existing truck chutes 51. The invention 10 is selectively installed farther upwards within chutes 51, depending upon user's (not shown) desired positioning of invention 10. User thereby locates concrete 53 delivery more exactly to the desired location. Trough 26 is, in the preferred embodiment, about 2' long.

On the delivery end of invention 10 is fixed end plate 11. End plate upper edge 12 aligns with peripheral edges 13 of trough 26.

The elongated half-moon shape of plate 11 further matches and attaches to trough 26, with attachment forming trough/plate angle 33. End plate 11, with end of trough 26, thereby forms an angled blockage.

Angle 33 is in the preferred range of 20–45 degrees relative to the linear direction of the trough 26. Angle 33 provides for more laminar flow of typically heavily viscous concrete 53 by directing concrete 53 toward trough funnel 19. Angle 33 provides for channeled flow of concrete 53, thereby discouraging spillage over edges 13 of trough 26. Funnel 19 attaches to bottom of delivery end 28 of trough 26. Trough aperture 27 opens to coincide with the dimension of upper cone 30 of trough funnel 19. Funnel 19 is permanently attached to aperture 27. Funnel 19 tapers downward to lower cone 31 that attaches to outlet nozzle 18.

Funnel 19 further enhances the laminar flow of concrete 53, and, in conjunction with trough/plate angle 33, further contributes to concrete 53 flow, while simultaneously enhancing the spill-resistant characteristics of invention 10. Flowing through outlet nozzle 18, concrete 53 exits via nozzle outlet 32 into a desired vessel (not shown) or concrete form 52, or the like.

Figure 5:
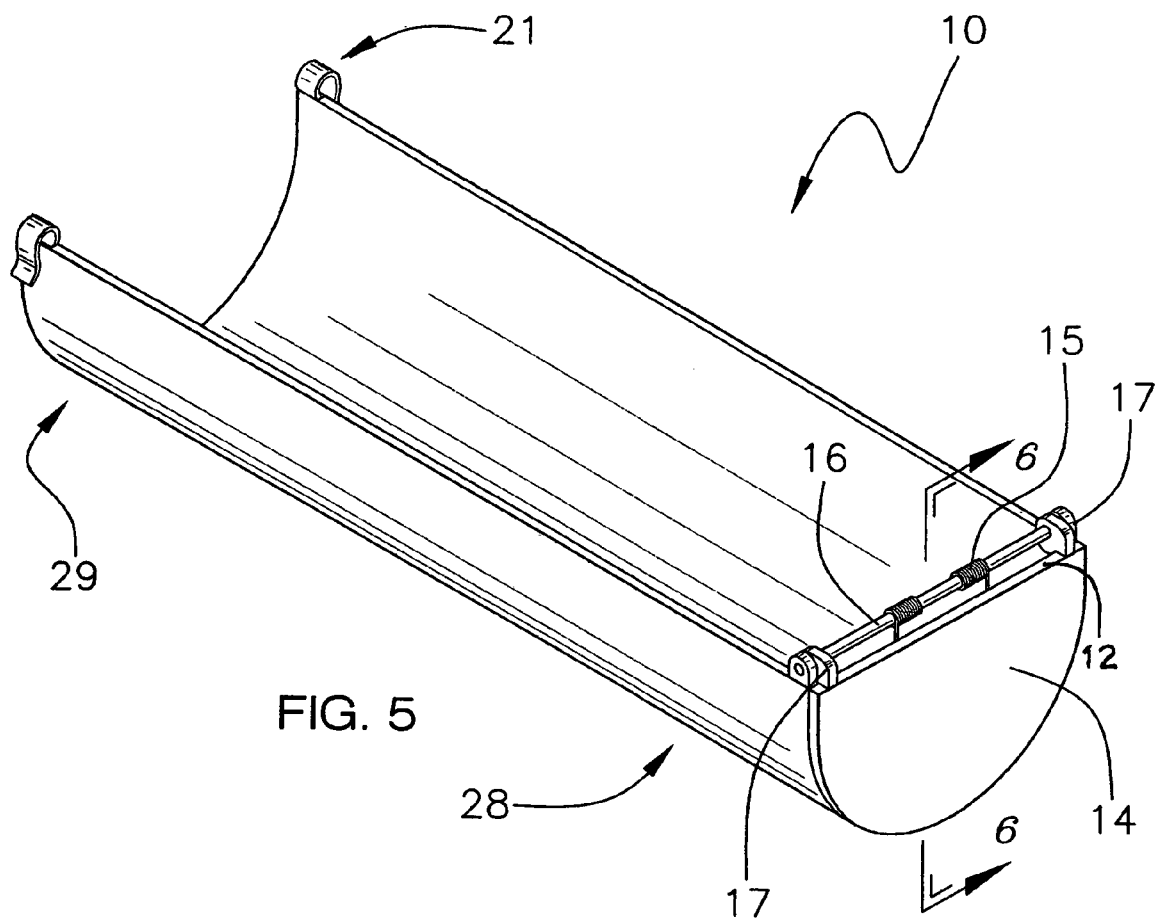
FIG. 5 is a perspective view of an alternate embodiment of the invention.
Figure 6:
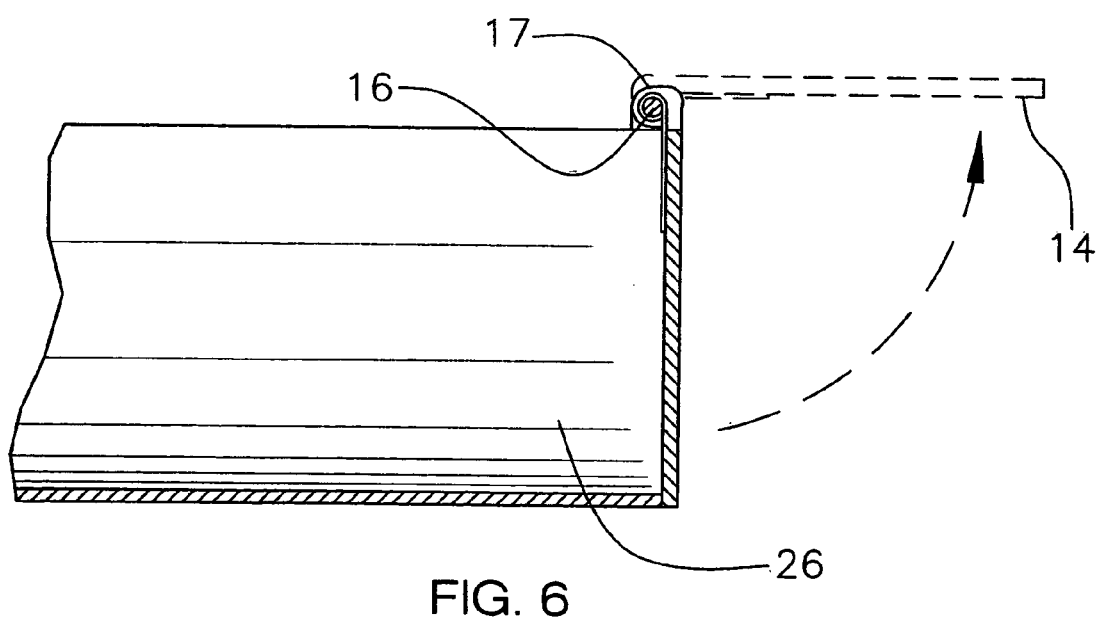
FIG. 6 is a lateral view of FIG. 5.

Refer now to FIGS. 5 and 6, to an additional embodiment of invention 10. Invention 10 terminates in end flap 14 at delivery end 28 of trough 26. Flap 14 faces trough 26 at a right angle to the longitudinal plane of trough 26. End plate upper edge 12 of flap 14 coincides with the upper peripheral edges 13 of trough 26. Flap 14 further coincides in shape with said trough. Attached to upper edge of flap 14 and also to peripheral edges 13 of trough 26 are hinges 17. Pivoting within hinges 17 is pivot rod 16. Torsion springs 15 attach to and encircle rod 16 and therefrom attach to the upper back surface of flap 14. Torsion springs 15 are tensioned to hold flap 14 closed until concrete 53 pushes against flap 15. Flap 14 then pivots outwardly to allow concrete 53 flow. This embodiment of invention 10 is typically used with a wheelbarrow (not shown) or small concrete form 52, where the angle of truck chute 51 might be reduced with respect to the ground. Utilizing flap 14, with tension from springs 15, enables the selective control of concrete 53 flow from a typical truck 50.

Figure 4:
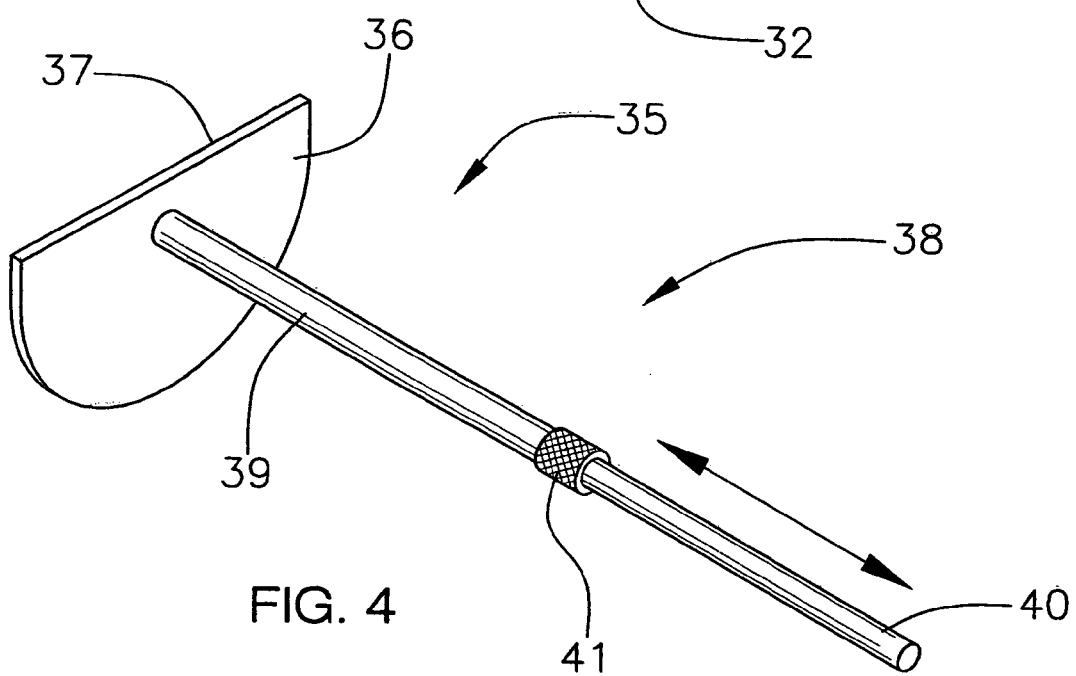
FIG. 4 is a perspective view of the concrete rake of the invention.

Refer to FIG. 4 to tineless concrete rake 35 of invention 10. Rake 35 is further comprised of telescoping rake handle 38.

Handle 38 attaches to the flat side of rake scraper 36. Rake scraper 36 is half-mooned shaped with scraper upper edge 37. When inserted within the trough 26, upper edges 37 are on a plane even with that of peripheral edges 13 of trough 26. The half-moon shape of scraper 36 loosely fits within trough 26. Flow of concrete 53 is thereby further controlled within trough 26, whether in assisting the gravitational flow of concrete 53 or aiding in the function of flap 14. As concrete 53 is typically highly viscous and difficult to clean out of chute 51 and trough 26, rake 35 is of further aid to invention 10. Handle 38 of rake 35 is comprised of proximal handle end 40 of smaller diameter than distal handle end 39. Knurled compression nut 41 is loosened to allow proximal end 40 to selectively slide within distal end 39. Knurled compression nut 41 is at juncture of said proximal end 40 and said distal end 39. Tightening compression nut 41 selectively and firmly establishes desired length of handle 38.

In use, then, the preferred embodiment of improved concrete chute attachment 10 is retrieved from its storage (not shown) within or about a concrete truck 50. Locating existing chute 51 to its approximately desired position, invention 10 is positioned to for pouring concrete 53 into desired destination, with nozzle outlet 32 positioned. Spring clip flare 23 is positioned on top of each of chute 51 peripheral edges (not shown). Either through a blow or pressure, flare 23 is forced down upon the chute's edges until loop constriction 24 of spring clip 21 has slipped over the chute's edges, thereby selectively fastening the trough 26 into place. Trough 26 may then be moved resistibly up or down truck chute 51 for longitudinal location. Truck operator (not shown) actuates release mechanism (not shown) of typical truck 50, to provide the desired flow of concrete 53 along existing truck chute 51.

Upon concrete 53 reaching delivery end 28 of trough 26, concrete 53 is directed downward toward trough funnel 19 by virtue of the angled attachment of trough 26 to end plate 14 at trough/plate angle 33. Concrete 53 is thereby directed to begin laminar exit through trough funnel 19 by virtue of upper cone 30 tapering to lower cone 31. Concrete 53 exits funnel 19 into nozzle 18, there to exit through nozzle outlet 32. Nozzle outlet 32 is positioned over concrete form 52 or the like.

With respect to the above description then, it is to be realized that the optimum dimensional relationships for the parts of the concrete chute attachment, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A concrete chute attachment for use with a concrete mixing truck chute, the chute attachment comprising:

a hollow U-shaped trough comprising a lower half of a cylinder with an open top and a pair of linear upper peripheral edges, the trough having an attachment end for the mixing truck chute;

an chute attachment means for the attachment end, the chute attachment means comprising a pair of inverted U-shaped clips attached perpendicularly to the linear upper peripheral edges of the trough respectively, each clip comprising:

a spring loop of the clip;

a loop constriction continuing from the spring loop;

a spring clip flare extended downward and outward from the spring loop constriction, each flare providing for selective attachment of the attachment end of the trough to the chute of the concrete truck;

a delivery end of the trough;

an end plate of the delivery end, an upper edge of the end plate coinciding with the upper peripheral edges of the trough, the end plate attached to the trough, thereby forming a blockade at the delivery end of the trough;

an aperture on a bottom of the delivery end of the trough, the aperture for exit of concrete;

a funnel attached to the aperture, the funnel comprising an upper cone tapering downward into a lower cone;

an outlet nozzle attached to the lower cone of the funnel.

2. The chute attachment of claim 1 wherein the end plate attachment to the chute comprises an acute angle relative to a length of the trough.

3. A concrete chute attachment for use with a concrete mixing truck chute, the attachment comprising:

a hollow U-shaped trough comprising a lower half of a cylinder with an open top and a pair of linear upper peripheral edges, the trough having an attachment end for attaching the trough to the mixing truck chute;

an attachment means for selectively attaching the attachment end to the chute, the attachment means comprising a pair of inverted U-shaped clips attached perpendicularly to the linear upper peripheral edges of the trough respectively, each clip comprising:

a spring loop of the clip;

a loop constriction continuing from the spring loop;

a spring clip flare extended downward and outward from the loop constriction, each flare providing for selective attachment of the attachment end of the trough to the chute of the concrete truck;

a delivery end of the trough, the delivery end at an end of the trough opposite the attachment end;

a U-shaped end flap hingedly connected to the delivery end, the flap connected to the upper peripheral edges of the trough;

hinge springs for resisting the opening of the flap.

* * * * *